United States Patent [19]

Okada et al.

[11] Patent Number: 5,114,793

[45] Date of Patent: May 19, 1992

[54] MAGNETIC RECORDING MEDIUM COMPRISING A SPECIFIED POLYURETHANE BINDER

[75] Inventors: Tomoyuki Okada, Ottawa, Canada; Naoki Kannen, Utsuomiya, Japan; Tadashi Nishimori; Rikio Tsushima, both of Wakayama, Japan

[73] Assignee: Kao Corporation, Tokyo, Japan

[21] Appl. No.: 715,739

[22] Filed: Jun. 18, 1991

Related U.S. Application Data

[63] Continuation of Ser. No. 187,975, Apr. 29, 1988, abandoned.

[30] Foreign Application Priority Data

| May 6, 1987 | [JP] | Japan | 62-110347 |
| Jul. 24, 1987 | [JP] | Japan | 184734 |
| Jul. 24, 1987 | [JP] | Japan | 62-184736 |

[51] Int. Cl.$^5$ .............................................. G11B 5/00
[52] U.S. Cl. .............................. 428/425.9; 428/694; 428/900

[56] References Cited

U.S. PATENT DOCUMENTS

| 3,864,133 | 2/1975 | Hisamatsu et al. | 96/115 P |
| 4,088,498 | 5/1978 | Faust | 96/115 P |
| 4,419,406 | 12/1983 | Isobe et al. | 428/422 |
| 4,448,846 | 5/1984 | Chang et al. | 428/412 |
| 4,560,616 | 12/1985 | Okita et al. | 428/423.1 |
| 4,567,109 | 1/1986 | Lehner et al. | 428/425.9 |
| 4,634,633 | 1/1987 | Ninomiya et al. | 428/425.9 |
| 4,727,126 | 2/1988 | Chen | 526/302 |

*Primary Examiner*—Merrell C. Cashion, Jr.
*Assistant Examiner*—Stevan A. Resai
*Attorney, Agent, or Firm*—Birch, Stewart, Kolasch & Birch

[57] ABSTRACT

A magnetic recording medium which comprises a nonmagnetic support and a magnetic layer thereon comprising a binder and powder of a ferromagnetic substance dispersed in the binder, the binder comprising a crosslinked product of a polyurethane having an average molecular weight of 900 to 50,000 and and comprising at least one unit of the formula (I):

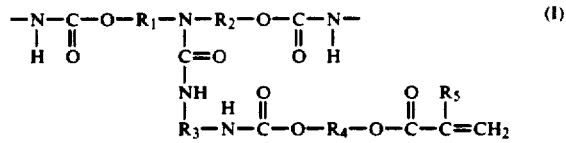

in which $R_1$, $R_2$ and $R_4$ each are an alkylene, $R_3$ is a hydrocarbon group derived from a di-isocyanate compound and $R_5$ is hydrogen or methyl, in one molecular thereof and having —OH, —NCO or —OO-C—CR$_5$=CH$_2$ at both terminals of the main chain thereof, provided that the terminals of the main chain are not —NCO when the molecular weight of the polyurethane ranges from 900 to 10,000. The polyurethane resin can be prepared by using as a starting material a polymerizable dihydorxyl compound of the general formula (II):

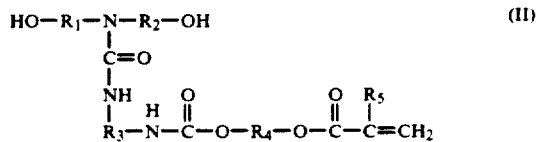

in which $R_1$ $R_2$ and $R_4$ each are an alkylene, $R_3$ is a hydrocarbon group and $R_5$ is —H or —CH$_3$.

8 Claims, No Drawings

MAGNETIC RECORDING MEDIUM COMPRISING A SPECIFIED POLYURETHANE BINDER

This application is a continuation, of application Ser. No. 07/187,975 filed on Apr. 29, 1988, now abandoned, the entire contents of which are incorporated herein by reference.

BACKGROUND OF THE INVENTION (1) Field of the Invention

The present invention relates to a magnetic recording medium, and more particularly to a magnetic recording medium wherein a radiation-curable compound is used as a binder and which improves durability.

(2) Description of the Prior Art

As a method of producing a magnetic recording media generally used widely, there has been a method in which at least one thermoplastic resin such as vinyl chloride-vinyl acetate resin, vinyl chloride-vinylidene chloride resin, cellulose resin, acetal resin, urethane resin, acrylonitrile-butadiene resin, etc. is used, either singly or in combination, as a binder. This method, however, has the drawback that a magnetic layer obtained has poor abrasion resistance, resulting in contamination of a feed passage of a magnetic tape.

There has also been known a method wherein a thermoplastic resin, such as melamine resin, and a urea resin is used; or a method in which a binder capable of being crosslinked by a chemical reaction, for instance, an isocyanate compound or an epoxy compound is added to the thermoplastic resin. The use of the crosslinkable binder, however, has the following drawbacks (1) and (2).

(1) The storage stability of a resin solution having a magnetic powder dispersed therein is poor, namely, the pot life of the solution is short, and it is therefore impossible to maintain uniform physical properties of a magnetic coating liquid and hence the uniform quality of magnetic tapes.

(2) A heat treatment step is required for curing a coating after the coating and drying steps, and it takes a long time to obtain a finished product.

As a means for overcoming these drawbacks, a method of producing magnetic media in which acrylic acid ester oligomer and monomer are used as a binder and curing after drying is effected by electron beams is disclosed in Japanese patent publication No. 47-12423 (1972), Japanese Patent Application Laid-Open (KOKAI) Nos. 47-13639 (1972), 47-13104 (1972), 50-77433 (1975) and 57-130229 (1982), etc. According to the disclosed method, however, it has been impossible to obtain a magnetic recording medium having high electrical characteristics, mechanical properties or durability.

Recently, there has been a particular demand for a high degree of electrical characteristics, and there has therefore been an increasing demand for a magnetic coating liquid which provides good dispersion properties of the ferromagnetic powder. If the dispersion properties of the ferromagnetic powder are poor, a lowering of output or generation of noise would result.

Besides, the conventional method in which electron beam curing is used has the drawback that when the content of a magnetic substance is increased for high-density recording, the storage stability of the magnetic coating liquid becomes poor and the electrical characteristics of the magnetic tape obtained are unsatisfactory for practical use. In addition, for prolonging the recording time of the magnetic tape, it is necessary that the support be thinner and the mechanical properties of the magnetic layer be improved.

Thus, with the recent wide spread of magnetic recording media such as video tapes, floppy disks, etc., severe use conditions have come to be imposed on the magnetic recording media, but a magnetic layer provided with mechanical properties sufficient for the severe conditions has not been attained.

DISCLOSURE OF THE INVENTION

The present inventors have made various studies for overcoming the drawbacks of the prior art such as the method in which a thermoplastic resin, a thermosetting resin or the like is used as a binder, the method in which a binder capable of being crosslinked by a chemical reaction is added, the method in which a binder curable through electron beam crosslinking is used, etc., and, as a result of the studies, the present invention has been attained.

According to the present invention, there is provided a magnetic recording medium which comprises a non-magnetic support and a magnetic layer, coated on the support, said magnetic layer comprising a binder and powder of a ferromagnetic substance dispersed in the binder, said binder comprising a crosslinked product of a polyurethane having an average molecular weight of 900 to 50,000 and comprising at least one unit having the formula (I) in one molecule thereof and having —OH, —NCO or —OOC—CR$_5$=CH$_2$ at both terminals of the main chain thereof, provided that the terminals of the main chain thereof are not —NCO when the molecular weight of the polyurethane ranges from 900 to less than 10,000.

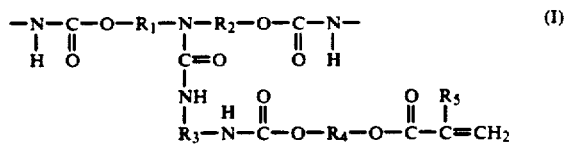

and wherein R$_1$, R$_2$ and R$_4$ each are an alkylene, R$_3$ is a hydrocarbon group derived from a di-isocyanate compound and R$_5$ is hydrogen or methyl.

Furthermore, according to the present invention, there is provided a polymerizable dihydroxyl compound having the following general formula (II):

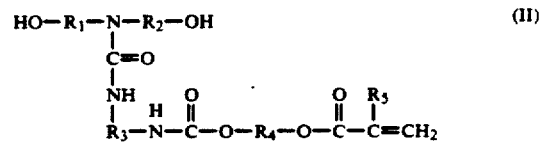

wherein R$_1$, R$_2$ and R$_4$ are each an alkylene, R$_3$ is a hydrocarbon group and R$_5$ is hydrogen or methyl. R$_3$ is preferably a hydrocarbon group derived from a di-isocyanate compound.

With respect to the polyurethane used in the present invention, there are two modes: in one mode, said polyurethane is a urethane oligomer having a molecular weight of 900 to less than 10,000, and in the other mode, said polyurethane is a polyurethane having a molecular weight of 10,000 to 50,000.

When the urethane oligomer is used, the present invention relates to a magnetic recording medium which comprises a non-magnetic support and a magnetic layer, coated on the support, said magnetic layer, comprising a binder and powder of a ferromagnetic substance dispersed in the binder, said binder comprising a crosslinked product of a urethane oligomer having a molecular weight (determined by analysis of the terminal functional groups of the molecule) of to less than 10,000, comprising at least one unit having the above-mentioned formula (I) in one molecule thereof and having

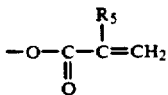

at both terminals of the main chain thereof.

The urethane oligomer according to the present invention has a molecular weight (determined by analysis of the terminal functional groups of the molecule) of 900 to less than 10,000.

The urethane oligomer can be produced as follows.

(i) First, a dihydroxyl compound having the following general formula (II):

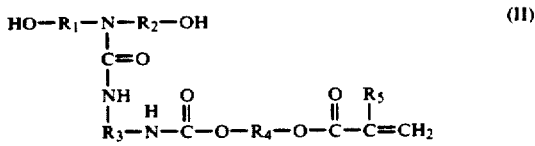

wherein $R_1$, $R_2$ and $R_4$ each are an alkylene, $R_3$ is a hydrocarbon group derived from a di-isocyanate compound and $R_5$ is —H or —$CH_3$, is reacted with a di-isocyanate compound to form a compound having isocyanate group at both terminals of the molecule thereof. In this case, the di-isocyanate compound is used in an excess molar quantity relative to the dihydroxyl compound. In consideration of the ease of handling of the product and the necessity for making the molecular weight of the objective urethane oligomer less than 10,000, it is preferable to use the di-isocyanate compound in an amount of about 1.5 to 2.0 moles per mole of the dihydroxyl compound.

(ii) Next, the compound having the isocyanate group at both terminals of the molecule thereof obtained in (i) above is reacted with a polyol compound, whereby a urethane oligomer having a molecular weight of 900 to less than 10,000, comprising at least one unit having the above-mentioned formula (II) in one molecule thereof and having —OH at both terminals of the main chain thereof can be obtained. In this case, also, the polyol compound is used in an excess molar quantity relative to the compound having the isocyanate group at both terminals of the molecule thereof. On the same ground as in (i) above, it is preferable to set the molar ratio of the isocyanate-terminated compound to the polyol compound in the range of about 1:1.5 to 1:2.0

(iii) Further, the terminals of the urethane oligomer having -OH at both terminals of the main chain thereof obtained in (ii) above are converted into (meth)acryloyl, whereby a urethane oligomer having

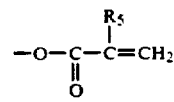

at both terminals of the main chain thereof can be obtained.

The conversion into (meth)acryloyl can be carried out by a method in which the urethane oligomer having —OH at both terminals of the main chain thereof obtained in (ii) is reacted with a di-isocyanate compound to once convert both terminals of the main chain into isocyanate groups, and then the resultant product is reacted with a compound having a (meth)acrylic double bond and an isocyanate-reactive group in the molecule thereof, thereby obtaining the objective urethane oligomer.

Alternatively, the conversion into (meth)acryloyl may be carried out by reacting the urethane oligomer obtained in (ii) with (meth)acrylic acid or a lower alkyl ester thereof.

When the polyurethane having a molecular weight of 10,000 to 50,000 is used, the present invention relates to a magnetic recording medium which comprises a non-magnetic support and a magnetic layer, coated on the support, comprising a binder and powder of a ferromagnetic substance dispersed in the binder, said binder comprising a crosslinked product of a polyurethane resin having a molecular weight (determined by gel permeation chromatography) of 10,000 to 50,000, comprising at least one unit having the above-mentioned general formula (I) in one molecule thereof and having —OH, —NCO or

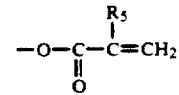

at both terminals of the main chain thereof.

The polyurethane resin used as a binder in the present invention has a number average molecular weight, as determined by gel permeation chromatography (column: Shodex A-803/A-804 mixture, produced by Showa Denko K.K.), of 10,000 to 50,000, preferably 10,000 to 35,000. If the number average molecular weight of the polyurethane resin is less than 10,000, the mechanical properties of the magnetic layer and the adhesion of the layer to the support are poor. On the other hand, if the number average molecular weight exceeds 50,000, the dispersibility of the magnetic powder is worsened.

The polyurethane resin according to the present invention can basically be prepared by the following methods.

(1) First, a novel dihydroxyl compound having the following general formula (II):

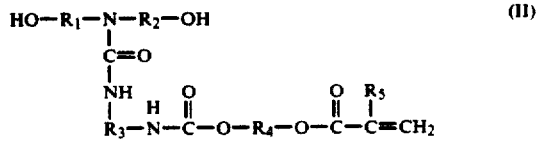

wherein $R_1$, $R_2$ and $R_4$ each are an alkylene, $R_3$ is a hydrocarbon group derived from a di-isocyanate compound and $R_5$ is —H or —$CH_3$, is reacted with an excess molar quantity of a di-isocyanate compound to form a compound having isocyanate group at both terminals of the molecule thereof. In consideration of the ease of the reaction process and the ease of handling of the reaction product, it is preferable to use about 1.5 to 2.0 moles of the di-isocyanate compound per mole of the dihydroxyl compound.

Next, the compound having the isocyanate group at both terminals of the molecule thereof is reacted with an excess molar quantity of a polyol compound to form a urethane oligomer having —OH at both terminals of the main chain thereof. In this case, also, it is preferable to use the hydroxyl-containing compound in an amount of about 1.5 to 2.0 moles per mole of the isocyanate-terminated compound.

Further, the urethane oligomer obtained as above is reacted with a di-isocyanate compound, whereby a polyurethane resin having —OH or —NCO at both terminals of the main chain thereof can be obtained. In this case, in addition to the urethane oligomer having the hydroxyl group at both terminals of the molecule thereof, other polyol component may be jointly used. The molar ratio of OH/NCO of the polyol and the di-isocyanate compound is in the range of 1/0.85 to 1/1.15, preferably 1.0/0.95 to 1.0/1.05.

The polyurethane resin having

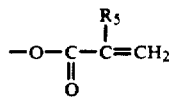

at both terminals of the main chain thereof can be obtained by reacting the above-mentioned polyurethane resin having —NCO at both terminals of the main chain thereof with a compound having a (meth)acryloyl double bond and an isocyanate-reactive group in the molecule thereof, the molar ratio of the reactants being about 1:2.

When the polyurethane resin having —OH at both terminals of the main chain thereof is used, the polyurethane resin is reacted with a di-isocyanate compound in a molar ratio of about 1:2, thereby converting both terminals of the main chain into —NCO, and then the objective polyurethane resin can be obtained in the same manner as above. Alternatively, the terminals of the main chain may be converted into (meth)acryloyl by reaction with (meth)acrylic acid or a lower alkyl ester thereof.

While a method of preparing the objective polyurethane resin through a urethane oligomer (this term is synonymous with "urethane prepolymer") has been described above, a method based on direct urethane formation, as follows, may also be applied.

(2) The dihydroxyl compound having the above formula (II) or a mixture thereof with the other polyol component is reacted directly with a di-isocyanate compound, whereby a polyurethane resin having —OH or —NCO at both terminals of the main chain thereof can be obtained In this case, the molar ratio of OH/NCO of the polyol and the di-isocyanate is in the range of 1/0.85 to 1/1.15, preferably 1.0/0.95 to 1.0/1.05.

Conversion of both terminals of the main chain into

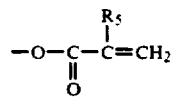

can be carried out by the above-mentioned method.

The dihydroxyl compound having the above-mentioned general formula (II) for use as a starting material for the urethane resin according to the present invention is a novel compound, and can basically be produced by the following steps.

(a) First, a di-isocyanate compound and a hydroxyalkyl (meth)acrylate compound are mixed with each other and stirred. In this case, it is preferable to add a polymerization inhibitor such as hydroquinone and to set the temperature to 70° C. or lower.

(b) Then, an inert organic solvent such as methyl ethyl ketone is added to the reaction system, further a dialkanolamine is added to the system, and the resultant mixture is stirred. In this case it is preferable to add the dialkanolamine dropwise to the system and to set the temperature of the system to 10° C. or lower.

The reaction time is not particularly limited, and depends on the reactant compounds. To achieve a certain degree of yield, however, the reaction time is ordinarily 2 to 5 hours in (a), and 3 to 10 hours in (b).

Referring to the starting compounds for use in the production of the polymerizable dihydroxyl compound, the di-isocyanate compound may be, for example, an aromatic di-isocyanate such as m-phenylene diisocyanate, p-phenylene diisocyanate, 1-chloro-2,4-phenylene diisocyanate, 2,4-tolylene diisocyanate, 2,6-tolylene diisocyanate, 1,5-naphthtylene diisocyanate, diphenylmethane-4,4'-diisocyanate, 3,3'-dimethyl-4,4'-biphenylene diisocyanate, etc.; an aliphatic di-isocyanate such as ethane diisocyanate, propane diisocyanate, butane diisocyanate, pentane diisocyanate, hexane diisocyanate, heptane diisocyanate, octane diisocyanate, nonane diisocyanate, decane diisocyanate, etc.; isophorone diisocyanate, or the like. Among others, 2,4-tolylene diisocyanate and isophorone diisocyanate, in which the two isocyanate groups differ in reactivity, are preferred.

This is because it is advantageous that the hydroxyalkyl (meth)acrylate reacts mainly with one of the two isocyanate groups of the di-isocyanate compound in the first-stage reaction of the two compounds, for a higher yield of the final objective product.

The hydroxylalkyl (meth)acrylate may be, for example, hydroxyethyl methacrylate, hydroxypropyl (meth)acrylate, hydroxybutyl (meth)acrylate, hydroxyhexyl (meth)acrylate or the like. The dialkanolamine may be, for example, diethanolamine, dipropanolamine, dibutanolamine, dihexanolamine or the like.

The di-isocyanate compounds which can be used for preparation of the polyurethane from the dihydroxyl compound having the general formula (II), either through preparation of a urethane oligomer or directly, may include, for example, aromatic di-isocyanates such as m-phenylene diisocyanate, p-phenylene diisocyanate, 1-chloro-2,4-phenylene diisocyanate, 2,4-tolylene diisocyanate, 2,6-tolylene diisicyanate, 1,5-naphthylene diisocyanate, diphenylmethane-4,4'-diisocyanate, 3,3'-dimethyl-4,4'-biphenylene diisocyanate, etc.; aliphatic di-isocyanates such as ethane diisocyanate, propane diisocyanate, butane diisocyanate, pentane diisocyanate, hexane diisocyanate, heptane diisocyanate, octane diisocyanate, nonane diisocyanate, decane dissocyanate, etc.; isophorone diisocyanate, etc.

Similarly, the polyol compounds which can be used for the production of the urethane oligomer or the polyurethane resin may include, for example, glycols such as ethylene glycol, 1,2-propylene glycol, 1,3-propylene glygol, polypropylene glycol, 2,3-butylene glycol, 1,4-butylene glycol, 2,2-dimethyl-1,3-propanediol, diethylene glycol, polyethylene glycol, 1,5-pentamethylene glycol, 1,6-hexamethylene glycol, cyclohexane-1,4-diol, cyclohexane-1,4-dimethanol, polytetramethylene glycol, etc.; polyester polyols obtained by polycondensation of one or a mixture of the glycols with a dibasic acid such as succinic acid, maleic acid, adipic acid, glutaric acid, pimelic acid, suberic acid, azelaic acid, sebacic acid, phthalic acid, isophthalic acid, terephthalic acid, hexahydrophthalic acid, hexahydroisophthalic acid, etc. or an ester or halide of the dibasic acid; and, further, polycaprolactone polyols obtained by ring-opening addition polymerization of a lactone such as ε-caprolactone in the presence of a glycol or the like. The polyol compound to be used for formation of the urethane oligomer or for direct formation of the urethane preferably has a molecular weight of 100 to 2,000, particularly 500 to 1,000.

The compound having a (meth)acrylic double bond and an isocyanate-reactive group in the molecule thereof, for use in converting both terminals of the main chain into acryloyl, may be, for example, a 2-hydroxyalkyl acrylate or methacrylate, more specifically, 2-hydroxyethyl acrylate or methacrylate, 2-hydroxypropyl acrylate or methacrylate, 2-hydroxybutyl acrylate or methacrylte, 2-hydroxyoctyl acryalte or methacrylate, 2-hydroxydodecanyl acrylate or methacrylate, 2-hydroxy-3-chloropropyl acrylate or methacrylate, 2-hydroxy-3-acryloxypropyl acryalte or methacrylate, 2-hydroxy-3-methacryloxypropyl acrylate or methacrylate, 2-hydroxy-3-allyloxypropyl acrylate or methacrylate, 2-hydroxy-3-cinnamylpropyl acrylate or methacrylate, 2-hydroxy-3-phenoxypropyl acrylate or methacrylate, 2-hydroxy-3-(o-chlorophenoxy)propyl acrylate or methacrylate, 2-hydroxy-3-(p-chlorophenoxy)propyl acrylate or methacrylate, 2-hydroxy-3-(2,4-dichlorophenoxy)-propyl acrylate or methacrylate, 2-hydroxy-3-acetoxypropyl acrylate or methacrylate, 2-hydroxy-3-propionoxypropyl acrylate or methacrylate, 2-hydroxy-3-chloroacetoxypropyl acrylate or methacrylate, 2-hydroxy-3-dichloroacetoxypropyl acrylate or methacrylate, 2-hydroxy-3-trichloroacetoxypropyl acrylate or methacrylate, 2-hydroxy-3-benzoxypropyl acrylate or methacrylate, 2-hydroxy-3-(o-chlorobenzoxy)propyl acrylate or methacrylate, 2-hydroxy-3-(p-chlorobenzoxy)propyl acrylate or methacrylate, 2-hydroxy-3-(2,4-dichlorobenxoxy)-propyl acrylate or methacrylate, 2-hydroxy-3-(3,4-dichlorobenzoxy)propyl acrylate or methacrylate, 2-hydroxy-3-(2,4,6-trichlorophenoxy)propyl acrylate or methacrylate, 2-hydroxy-3-(2,4,5-trichlorophenoxy)-propyl acrylate or methacrylate, 2-hydroxy-3-(o-chlorophenoxyacetoxy)propyl acrylate or methacrylate, 2-hydroxy-3-phenoxyacetoxypropyl acrylate or methacrylate, 2-hydroxy-3-(p-chlorophenoxyacetoxy)propyl acrylate or methacrylate, 2-hydroxy-3-(2,4,5-trichlorophenoxyacetoxy)propyl acrylate or methacrylate, 2-hydroxy-3-crotonoxypropyl acrylate or methacrylate, 2-hydroxy-3-cinnamyloxypropyl acrylate or methacrylate, 3-acryloxy-2-hydroxypropyl acrylate or methacrylate, 3-allyoxy-2-hydroxypropyl acrylate or methacrylate, 3-chloro-2-hydroxypropyl acrylate or methacrylate, 3-chloroxy-2-hydroxypropyl acrylate or methacryalte, or other similar acrylic or methacrylic acid ester; or a compound having active hydrogen capable of reacting with an isocyanate group and containing an acrylic double bond, such as acrylamide, methacrylamide, N-methylolacrylamide, etc.

To the reaction for forming the urethane oligomer and the reaction for forming the polyurethane, ordinary conditions for polyurethane reaction can be applied. For instance, a method comprising sufficiently mixing the reactants, pouring the reaction mixture on a flat plate or into a vat to heat the reaction mixture, then cooling the heated product and crushing the cooled product, a solution reaction method comprising bringing the reactants into reaction in an organic solvent consisting one or a mixture of dimethylformamide, toluene, xylene, benzene, dioxane, tetrahydrofuran, cyclohexane, methyl ethyl ketone, methyl isobutyl ketone, etc., or other production method can be adopted. In order to reduce the reaction temperature or to shorten the reaction time, a reaction catalyst may be added. Examples of the reaction catalyst include amine compounds such as triethylenediamine, tetramethylethylenediamine, tetramethylhexanediamine, etc., salts thereof, organometallic compounds such as dibutyltin dilaurate, tin octylate, lead octylate, manganese octylate, etc., mixtures thereof, etc. Further, antioxidant, UV absorber, hydrolysis preventive or the like may be mixed into the reaction mixture, either singly or in combination, for the purpose of enhancing the stability of the polyurethane resin obtained.

Moreover, in view of the use of the crosslinkable compounds as the reactants, a polymerization inhibitor such as hydroquinone may be used.

In the magnetic recording medium according to the present invention, the magnetic layer comprises a binder which, in turn, comprises the crosslinked product of the polyurethane resin as specified above. As the binder, there may be jointly used any of various resins which are ordinarily used as a binder, for instance, thermoplastic polyurethane resins; cellulose derivatives such as nitrocellulose, cellulose acetate, cellulose acetate butyrate, etc.; vinyl chloride/vinyl acetate resins such as vinyl chloride/vinyl acetate copolymer, vinyl chloride/vinyl acetate/vinyl alcohol copolymer, vinyl chloride/vinyl acetate/maleic acid copolymer, etc.; vinylidene chloride resins such as vinylidene chloride/-vinyl chloride copolymer, vinylidene chloride/acrylonitrile copolymer, etc.; polyester resins such as alkyd resin, linear polyester, etc.; acrylic resins such as (meth)acrylic acid/acrylonitrile copolymer, methyl (meth)acrylate/acrylonitrile copolymer, etc.; acetal resins such as polyvinyl acetal, polyvinyl butyral, etc.; phenoxy resins, epoxy resins, polyamide resins, butadiene/acrylonitrile copolymers, styrene/butadiene copolymers, etc., either singly or in combination.

Furthermore, conventional radiation-curable compounds, such as trimethylolpropane triacrylate, may also be used jointly.

When the other components than the crosslinked product of the polyurethane according to the present invention are used together with the crosslinked product as the binder, the composition of the binder is preferably so selected that the amount of the cross-linked product of the polyurethane resin is at least 50% by weight based on the total amount of the binder.

The powders of ferromagnetic substances which can be used in the present invention include, for example, powders of $\gamma$-$Fe_2O_3$, mixed crystals of $\gamma$-$Fe_2O_3$ and $Fe_3O_4$, Co-modified iron oxide, $CrO_2$, iron, etc. Also, any fine powder of an iron-based alloy can be preferably used. The particles of the fine ferromagnetic powder may have any shape, such as acicular, plate-like, spherical, etc.

The magnetic layer of the magnetic recording medium according to the present invention may comprise additives such as dispersant, lubricant, antistatic agent, abrasive, etc., in addition to the binder and the ferromagnetic powder.

The crosslinking of the urethane oligomer and the polyurethane resin according to the present invention is preferably carried out by using radiations, particularly, electron beams. The dosage of the electron beams is generally 0.5 to 20 Mrad.

The non-magnetic support for use in producing the magnetic recording medium according to the present invention may be formed of, for example, a polyester such as polyethylene terephthalate; a polyolefin such as polyethylene, polypropylene, etc.; a cellulose derivative such as cellulose triacetate, cellulose diacetate, etc.; a polycarbonate; polyvinyl chloride; a polyimide; a plastic such as aromatic polyamide; a metal such as Al, Cu, etc.; a paper, or the like. The form of the nonmagnetic support may be any of film, tape, sheet, disk, card, drum, etc. The surface of the support may be treated with corona discharge, radiations, UV rays or the like, or may be precoated with an appropriate resin.

EXAMPLES

The present invention will now be explained more in detail below while referring to nonlimitative Synthetic Examples 1 to 6 and Examples 1 to b 6.

In the following examples, the term "parts" means "parts by weight".

SYNTHETIC EXAMPLE 1 OF POLYURETHANE RESIN

A reaction vessel equipped with a thermometer, stirrer and a reflux condenser was charged with 200 parts of methyl ethyl ketone, 79 parts of the dihyroxyl compound having the following formula (III),

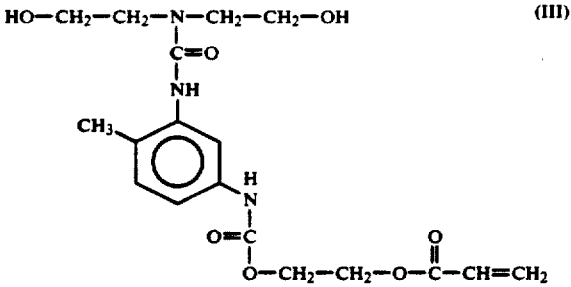

70.5 parts of tolylene diisocyanate (a 80:20 mixture of 2,4-tolylene diisocyanate and 2,6-tolylene diisocyanate) and 0.2 part of hydroquinone, and the resultant mixture was stirred at 70° C. for 4 hour. Then, 202 parts of polybutylene adipate having a molecular weight of 500 (with hydroxyl group at both terminals of the molecule thereof) and 400 parts of methyl ethyl ketone were added to the reaction mixture, and the resultant axmixture was stirred at 75° C. for 6 hours to obtain a urethane oligomer.

Further, 800 parts of polybutylene having a molecular weight of 1,000 (with hydroxyl group at both terminals of the molecule thereof), 108 parts of 1,4-butanediol, 416 parts of neopentyl glycol, 1,500 parts of diphenylmethane-4,4'-diisocyanate, 0.3 part of dibutyltin dilaurate and 3,000 parts of methyl ethyl ketone were placed into the reaction vessel, and the resultant mixture was stirred at 80° C. for 10 hours to obtain a polyurethane resin (PU-1).

The average molecular weight of the thus obtained resin determined by gel permeation chromatography was 16,000.

SYNTHETIC EXAMPLE 2 OF POLYURETHANE RESIN

The same reaction vessel as that used in Synthetic Example 1 was charged with 400 parts of methyl ethyl ketone, 198 parts of the dihydroxyl compound having the general formula (III) used in Synthetic Example 1, 224 parts of isophorone diisocyanate and 0.2 part of hydroquinone, and the resultant mixture was stirred at 70° C. for 6 hours. Then, 500 parts of polytetramethylene glycol having a molecular weight of 500 and 800 parts of methyl ethyl ketone were added to the reaction system, and the resultant admixture was stirred at 75° C. for 8 hours to obtain a urethane oligomer.

Further, 500 parts of polybutylene adipate having a molecular weight of 1,000 (with hydroxyl group at both terminals of the molecule thereof), 260 parts of neopentyl glycol, 153 parts of 1,6-hexanediol, 1,225 parts of diphenylmethane-4,4'-diisocyanate, 0.3 part of dibutyltin dilaurate and 1,800 parts of methyl ethyl ketone were added to the reaction vessel, and the resultant mixture was stirred at 80° C. for 10 hours to obtain a polyurethane resin (PU-2).

The average molecular weight of the thus obtained resin determined by gel permeation chromatography was 30,300.

SYNTHETIC EXAMPLE 3 OF POLYURETHANE RESIN

A polyurethane resin was obtained in the same manner as in Synthetic Example 1.

Then, to 800 parts of the polyurethane resin (which had an average molecular weight of 16,000 as determined by gel permeation chromatography), 26 parts of diphenylmethane-4,4'-diisocyanate was added, and the resultant mixture was stirred at 80° C. for 7 hours to form a polyurethane resin having isocyanate group at both terminals of the main chain thereof. Further, 12 parts of 2-hydroxyethyl acrylate was added to the reaction vessel, and the resultant mixture was stirred at 80° C. for 8 hours to obtain a polyurethane resin (PU-3) having acryloyl group at both terminals of the main chain thereof.

SYNTHETIC EXAMPLE 4 OF POLYURETHANE RESIN

A polyurethane resin was obtained in the same manner as in Synthetic Example 2.

Then, to 1,515 parts of the thus obtained polyurethane resin (which had a molecular weight of 30,300 as determined by gel permeation chromatography), 13 parts of 2-hydroxyethyl methacryalte was added, and the resultant mixture was stirred at 80° C. for 8 hours to obtain a polyurethane resin (PU-4) having methacryloyl group at both terminals of the main chain thereof.

SYNTHETIC EXAMPLE 5 OF POLYURETHANE RESIN

In the same manner as in Synthetic Example 1 except that the dihydroxyl compound having the formula (III) used in Synthetic Example 1 was replaced by 88.6 parts of the dihydroxyl compound having the following formula (IV),

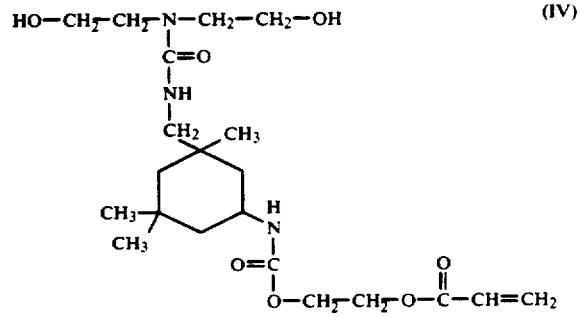

a polyurethane resin (PU-5) was obtained.

The average molecular weight of the thus obtained resin determined by gel permeation chromatography was 15,700.

SYNTHETIC EXAMPLE 6 OF POLYURETHANE RESIN

A reaction vessel equipped with a thermometer, a stirrer, a reflux-type condenser tube and a nitrogen gas inlet tube was charged with 270 parts of methyl ethyl ketone, 270 parts of cyclohexane, 160 parts of polybutylene adipate diol (having an average molecular weight of 1,000 as determined by terminal group analysis), 18 parts of 1,4-butylene glycol, 52 parts of 2,2'-dimethyl-1,3-propanediol, 39.5 parts of the dihydroxyl compound having the formula (III) used in Synthetic Example 1, 233.5 parts of diphenylmethane-4,4'-diisocyanate, 0.3 part of dibutyltin dilaurate as catalyst and 0.2 part of hydroquinone as polymerization inhibitor, and the resultant mixture was stirred at 80° C. for 10 hours to obtain a polyurethane resin.

Then, 14 parts of diphenylmethane-4,4'-diisocyanate was further added to the reaction system, and the resultant mixture was stirred at 80° C. for 5 hours. Thereafter, 6.5 parts of 2-hydroxyethyl acrylate was added to the reaction system, and the resultant admixture was stirred at 80° C. for 5 hours to obtain a polyurethane resin (PU-6) having acryloyl group at both terminals of the main chain thereof. The molecular weight of the thus obtained resin determined by gel permeation chromatography was 19,900.

EXAMPLES 1 to 6

Each of the compositions A to F shown in Table 1 was kneaded in a ball mill for 24 hours to obtain respective magnetic paints.

Then, each of the magnetic paints was applied to a 70-μm thick polyethylene terephthalate film so that the thickness of the coating after dried was 2μm, and the resultant coatings were irradiated with electron beams with a dosage of 5 Mrad.

Each of the thus obtained films was cut to form a floppy disk 5.25 inches in diameter, and the durability of each floppy disk was evaluated by fitting the floppy disk into a floppy disk drive and measuring the period of time required for the reproduction output to be lowered to 50% of the initial level, at 20° C. and at 40° C. The results are shown in Table 2.

TABLE 1

| Components of paint | Paint composition | | | | | |
|---|---|---|---|---|---|---|
| | A | B | C | D | E | F |
| Binder | | | | | | |
| PU 1 | 45 | | | | | |
| PU 2 | | 30 | | | | |
| PU 3 | | | 40 | | | |
| PU 4 | | | | 50 | | |
| PU 5 | | | | | 30 | |
| PU 6 | | | | | | 40 |
| VAGH[1] | | 15 | | | 10 | 5 |
| TMPTA[2] | 5 | 5 | 10 | | 10 | 5 |
| Components other than binder | | | | | | |
| Co-γ-Fe₂O₃[3] | 100 | 100 | 100 | 100 | 100 | 100 |
| Carbon black | 3 | 3 | 3 | 3 | 3 | 3 |
| Abrasive | 3 | 3 | 3 | 3 | 3 | 3 |
| Lubricant | 8 | 8 | 8 | 8 | 8 | 8 |
| Dispersant | 2 | 2 | 2 | 2 | 2 | 2 |
| Methyl ethyl ketone | 300 | 300 | 300 | 300 | 300 | 300 |

Notes:
[1] vinyl chloride/vinyl acetate copolymer, produced by Union Carbide Corporation, USA
[2] trimethylolpropane triacrylate
[3] Co-coated γ-Fe₂O₃

TABLE 2

| Examples | Magnetic paint | Durability under drive (hr) | |
|---|---|---|---|
| | | at 20° C. | at 40° C. |
| Example 1 | A | 100 or more | 100 or more |
| Example 2 | B | " | " |
| Example 3 | C | " | " |
| Example 4 | D | " | " |
| Example 5 | E | " | " |
| Example 6 | F | " | " |

SYNTHETIC EXAMPLE (1) OF URETHANE OLIGOMER

A reaction vessel equipped with a thermometer, a stirrer and a reflux condenser was charged with 400 parts of methyl ethyl ketone, 198 parts of the dihydroxyl compound having the following formula (III),

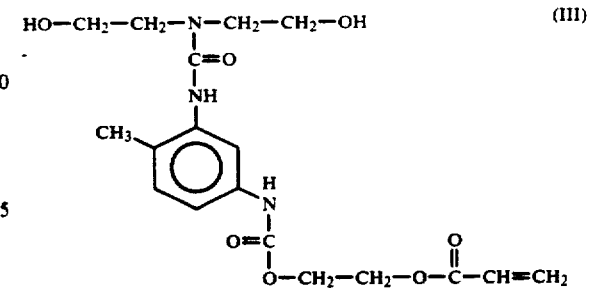

174 parts of tolylene diisocyanate (a 80:20 mixture of 2,4-tolylene diisocyanate and 2,6-tolylene diisocyanate) and 0.2 part of hydroquinone, and the resultant mixture was stirred at 70° C. for 4 hours. Then, 1,000 parts of polybutylene adipate having a molecular weight of 1,000 (with hydroxyl group at both terminals of the molecule thereof) and 800 parts of methyl ethyl ketone were added to the reaction system, and the resultant mixture was stirred at 75° C. for 6 hours to obtain a urethane oligomer.

SYNTHETIC EXAMPLE (2) OF URETHANE OLIGOMER 700 parts of the urethane oligomer having hydroxyl group at both terminals of the main chain thereof obtained in Synthetic Example (1) was transferred into another reaction vessel together with the reaction solvent, then 126 parts of diphenylmethane-4,4'-diisocyanate was added thereto, and the resultant mixture was stirred at 80° C. for 8 hours. Thereafter, 58 parts of 2-hydroxyethyl acrylate was added to the reaction system, and the resultant admixture was stirred at 80° C. for 8 hours to obtain a urethane oligomer having acrylocyl group at both terminals of the main chain thereof.

SYNTHETIC EXAMPLE (3) OF URETHANE OLIGOMER

The same reaction vessel as that used in Synthetic Example (1) was charged with 350 parts of methyl ethyl ketone, 198 parts of the dihydroxyl compound having the general formula (III) used in Synthetic Example (1), 130.5 parts of tolylene diisocyanate used in Synthetic Example (1) and 0.2 part of hydroquinone, and the resultant mixture was stirred at 80° C. for 8 hours. Then, 250 parts of $\epsilon$-caprolactone glycol (molecular weight: 500) and 250 parts of methyl ethyl ketone were added to the reaction system, and the resultant admixture was stirred at 80° C. for 8 hours to obtain a urethane oligomer having hydroxyl group at both terminals of the molecule thereof.

SYNTHETIC EXAMPLE (4) OF URETHANE OLIGOMER 300 parts of the urethane oligomer obtained in Synthetic Example (3) was transferred into another reaction vessel together with the reaction solvent, then 32.5 parts of 2-hydroxyethyl methacrylate was added thereto, and the resultant admixture was stirred at 80° C. for 8 hours to obtain a urethane oligomer having methacryloyl group at both terminals of the main chain thereof.

EXAMPLES 7 to 10 and COMPARATIVE EXAMPLES 1 and 2

Each of the compositions G to J shown in Table 3 was kneaded in a ball mill for 24 hours to obtain respective magnetic paints.

Then, each of the magnetic paints was applied to a 70-μm thick polyethylene terephthalate film so that the thickness of the coating after dried was 2 μm, and the resultant coatings were irradiated with electron beams with a dosage of 5 Mrad.

Each of the thus obtained films was cut to form a floppy disk 5.25 inches in diameter, and the durability of the floppy disk was evaluated by fitting the floppy disk into a floppy disk drive and measuring the period of time required for the reduction output to be lowered to 50% of the initial level, at 20° C. and at 40° C. The results are shown in Table 4.

By way of comparison, magnetic paints K and L shown in Table 3 were prepared in the same manner as above Only the magnetic paint K was subjected, after 24-hour kneading, to kneading for 1 hour by adding thereto 10 parts of a curing agent (trade name: COLONATE L, produced by Nippon Polyurethane Kogyo K.K.). Next, the thus prepared paint was applied to a 70-μm thick polyethylene terephthalate film so that the thickness of the coating after dried was 2 μm, and was dried and aged. Then, the thus obtained film was cut to form a floppy disk 5.25 inches in diameter, and the durability of the floppy disk was evaluated by fitting the floppy disk into a floppy disk drive and measuring the period of time required for the reproduction output to be lowered to 50% of the initial level, at 20° C. and at 40° C.

On the other hand, the magnetic paint L was treated in the same manner as the magnetic paints G to J, thereby forming a floppy disk, and the durability of the thus obtained floppy disk was evaluated by fitting the floppy disk into a floppy disk drive and measuring the period of time required for the reproduction output to be lowered to 50% of the initial level. The results are shown in Table 4.

TABLE 3

|  | Example 7 | Example 8 | Example 9 | Example 10 | Comparative Ex. 1 | Comparative Ex. 2 |
|---|---|---|---|---|---|---|
|  | Magnetic paint | | | | | |
|  | G | H | I | J | K | L |
| Binder |  |  |  |  |  |  |
| Synthetic Ex. (1) | 30 |  |  |  |  |  |
| Synthetic Ex. (2) |  | 35 |  |  |  |  |
| Synthetic Ex. (3) |  |  | 40 |  |  |  |
| Synthetic Ex. (4) |  |  |  | 40 |  |  |
| VAGH[1] | 5 | 10 | 5 | 5 | 20 | 15 |
| N-2304[2] | 5 |  |  | 5 | 30 | 25 |
| TMPTA[3] | 10 | 5 | 5 |  |  | 10 |
| Components other than binder |  |  |  |  |  |  |
| Co-γ-Fe$_2$O$_3$[4] | 100 | 100 | 100 | 100 | 100 | 100 |
| Carbon black | 3 | 3 | 3 | 3 | 3 | 3 |
| Abrasive | 3 | 3 | 3 | 3 | 3 | 3 |
| Lubricant | 8 | 8 | 8 | 8 | 8 | 8 |
| Cyclohexane | 150 | 150 | 150 | 150 | 150 | 150 |
| Methyl ethyl ketone | 100 | 100 | 100 | 100 | 100 | 100 |

Notes:
[1] vinyl chloride/vinyl acetate copolymer, produced by Union Carbide Corporation, USA
[2] thermoplastic polyurethane resin, produced by Nippon Polyurethane Kogyo K.K.
[3] trimethylolpropane triacrylate
[4] Co-coated γ-Fe$_2$O$_3$

TABLE 4

| Examples and Comparative Examples | Magnetic paint | Durability under drive (hr) at 20° C. | at 40° C. |
|---|---|---|---|
| Example 7 | G | 100 or more | 100 or more |
| Example 8 | H | " | " |
| Example 9 | I | " | " |
| Example 10 | J | " | " |
| Comparative Ex. 1 | K | 10 or less | 10 or less |
| Comparative Ed. 2 | L | " | " |

Examples concerning the dihydroxyl compound will now be described below.

EXAMPLE 11

A first-stage reaction was carried out by changing a reaction vessel having a stirrer, a thermometer and a reflux condenser attached thereto with 100 parts of 2,4-tolylene diisocyanate, 66.7 parts of 2-hydroxyethyl acrylate and 0.1 part of hydroquinone, and stirring the resultant mixture at 40° F. for 1 hour and then at 60° C. for 3 hours.

Next, a second-stage reaction was carried out as follows. To the reaction vessel was added 667 parts of methyl ethyl ketone, the reaction system was then cooled to 5° C., and 60.3 parts of diethanolamine was added dropwise to the reaction system at that temperature over 1 hour. After the dropwise addition, the resultant admixture was stirred at 20° C. for 6 hours, and then methyl ethyl ketone was distilled off to obtain a white powder.

The compound obtained on the first-stage reaction was subjected to determination of isocyanate concentration (by a di-n-butylamine/hydrochloric acid titration method), and the concentration was found to be about ½ times the value before the reaction. The residual isocyanate in the compound was reacted with ethanol, and after capping, the compound was analyzed by liquid chromatography (column: Hibar Lechrosorb Si-60; solvent: 0.5% methanol-containing dichloromethane). The analytical result showed that the compound was a compound having the following formula (IV).

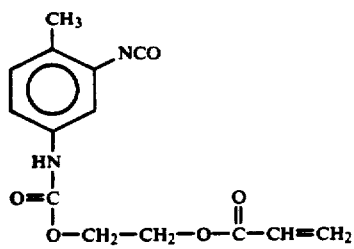

(IV)

The white powder obtained upon the second-stage reaction was subjected to potentiometric titration using perchloric acid, whereby it was confirmed that amino groups had disappeared. It was also confirmed by the above-mentioned di-n-butylamine/hydrochloric acid titration method that isocyanate groups had disappeared.

Further, it was confirmed by NMR that the white powder finally obtained was a compound having the following formula (V).

$^1$H-NMR (solvent DMSO-d) δ: internal standard TSP 2.1~2.3  Ar—CH$_3$   (c)

3.2~4.3  —CH$_2$—   (a)(b)(h)(i)

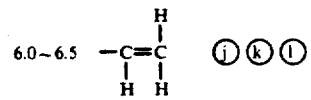  (j)(k)(l)

7.0~8.4  Ar—H   (d)(e)(f)

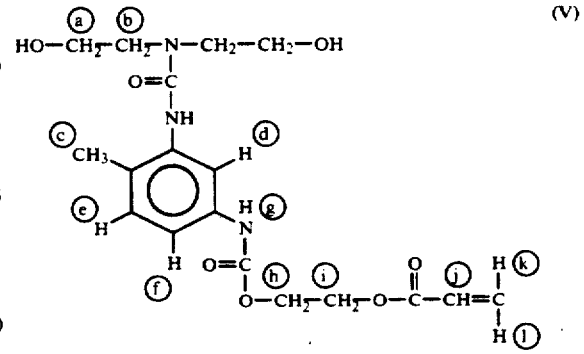

(V)

Then, a reaction vessel equipped with a stirrer, a thermometer and a reflux condenser was charged with 60.7 parts of the compound of the formula (V), 100 parts of polybutylene adipate (number average molecular weight: 1,000), 16 parts of 2,2-dimethyl-1,3-propanediol, 8 parts of 1,4-butylene glycol, 154 parts of diphenylmethane-4,4'-diisocyanate and 390 parts of methyl ethyl ketone, and the resultant mixture was stirred at 80° C. for 12 hours, to obtain a viscous liquid. When methyl ethyl ketone was distilled off from the viscous liquid, a polyurethane resin was obtained as a single mass.

EXAMPLE 12

A white powder was obtained in the same manner as in Example 11 except that 92.5 parts of dibutanolamine was used in place of the diethanolamine used in Example 11. The white powder thus obtained was analyzed in the same manner as in Example 11, and was found to be a compound having the following formula (VI).

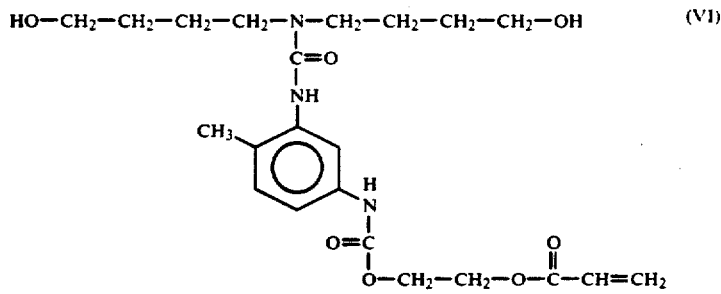

Then, 69.3 parts of the thus obtained compound of formula (VI) was subjected to a reaction in the same manner as in Example 11, to obtain a polyurethane resin.

We claim:

1. A magnetic recording medium which comprises a non-magnetic support and a magnetic layer coated on said non-magnetic support, said magnetic layer comprising a binder and powder of a ferromagnetic substance dispersed in said binder, said binder comprising a crosslinked product of a polyurethane having an average molecular weight of 900 to 50,000 and comprising at least one unit having the formula (I)

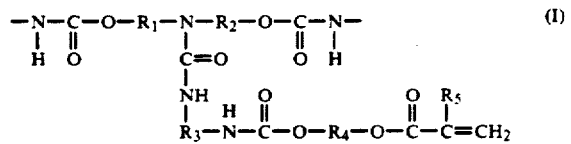

and wherein $R_1$, $R_2$ and $R_4$ are each an alkylene, $R_3$ is a hydrocarbon group derived from a di-isocyanate compound, and $R_5$ is hydrogen or methyl, said unit of formula (I) having —OH, —NCO or —OOC—$Cr_5$=$CH_2$ at both terminals of the main chain thereof, provided that the terminals of the main chain thereof are not —NCO when the molecular weight of the polyurethane is in the range of from 900 to less than 10,000.

2. The medium as claimed in claim 1, in which said polyurethane has a molecular weight of 900 to less than 10,000.

3. The medium as claimed in claim 1, in which said polyurethane has a molecular weight of 10,000 to 50,000.

4. The magnetic recording medium of claim 1, wherein said di-isocyanate is selected from the group consisting of an aromatic diisocyanate and an aliphatic diisocyanate.

5. The magnetic recording medium of claim 4, wherein said aromatic di-isocyanate is selected from the group consisting of m-phenylene diisocyanate, p-phenylene diisocyanate, 1-chloro-2,4-phenylene diisocyanate, 2,4-tolylene diisocyanate, 2,6-tolylene diisocyanate, 1,5-naphthylene diisocyanate, diphenylmethane-4,4'-diisocyanate, 3,3'-dimethyl-4,4'-biphenyl diisocyanate, and 3,3'-dimethyl-4,4'-biphenylene diisocyanate.

6. The magnetic recording medium of claim 1, wherein said aliphatic diisocyanate is selected from the group consisting of ethane diisocyanate, propane diisocyanate, butane diisocyanate, pentane diisocyanate, octane diisocyanate, nonane diisocyanate, decane diisocyanate, and isophorene diisocyanate.

7. The magnetic recording medium of claim 1, wherein said di-isocyanate is tolylene diisocyanate.

8. The magnetic recording medium of claim 1, wherein said di-isocyanate is isophorene diisocyanate.